United States Patent
Sunaga et al.

(10) Patent No.: US 6,776,062 B2
(45) Date of Patent: Aug. 17, 2004

(54) POWER TRANSMISSION SYSTEM

(75) Inventors: Isamu Sunaga, Saitama-ken (JP); Sunao Ishihara, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/281,964

(22) Filed: Oct. 29, 2002

(65) Prior Publication Data

US 2003/0089582 A1 May 15, 2003

(30) Foreign Application Priority Data

Nov. 15, 2001 (JP) ........................................ 2001-350839

(51) Int. Cl.⁷ .............................................. F16H 3/087
(52) U.S. Cl. .......................................... 74/339; 74/359
(58) Field of Search ........................ 74/339, 359, 360, 74/335, 336 R

(56) References Cited

U.S. PATENT DOCUMENTS

| | | | | |
|---|---|---|---|---|
| 4,544,057 A | * | 10/1985 | Webster et al. ............... | 477/86 |
| 4,627,312 A | * | 12/1986 | Fujieda et al. ............... | 477/124 |
| 5,313,856 A | * | 5/1994 | Schneider et al. ............ | 477/80 |
| 5,761,961 A | * | 6/1998 | Krauss et al. ................. | 74/333 |
| 6,550,352 B2 | * | 4/2003 | Okada et al. ................. | 74/335 |
| 6,561,052 B2 | * | 5/2003 | Kayano et al. ............... | 74/339 |

* cited by examiner

*Primary Examiner*—Sherry Estremsky
(74) *Attorney, Agent, or Firm*—Arent Fox PLLC

(57) ABSTRACT

A power transmission system capable of preventing a feeling of inertia travel caused by torque transmission interruption, without increasing the axial length of a transmission, thereby improving the speed position-shifting performance of the transmission, includes a plurality of gear pairs and synchromeshes connecting the plurality of gear pairs to an input or output shaft. A driving force assist mechanism supplies the driving force of a prime mover to the output shaft during a shift in speed position and a supplemental driving force has an auxiliary shaft arranged in parallel with the input and output shaft. An intermediate gear is connected to the input shaft and integrally formed with the auxiliary shaft. Auxiliary gears are connected to the output shaft and rotatably arranged on the auxiliary shaft. An assist clutch fastens one of the auxiliary gears to the auxiliary shaft during the shift in speed position.

7 Claims, 7 Drawing Sheets

POWER TRANSMISSION SYSTEM

BACKGROUND OF THE INVENTION

1. Field of the Invention

This invention relates to a power transmission system for transmitting a driving force of a prime mover to driving wheels via a stepped transmission.

2. Description of the Prior Art

Conventionally, a power transmission system of the above-mentioned kind has been proposed e.g. by Japanese Laid-Open Patent Publication (Kokai) No. 2000-65199. The power transmission system includes a five-forward-speed transmission having first to fifth speed input gears arranged on an input shaft thereof which is connected to an engine, in the mentioned order from the engine side, and first to fifth speed output gears arranged on an output shaft thereof, in constant mesh with the respective first to fifth speed input gears. These first to fifth speed input and output gears form first to fifth speed gear pairs, respectively. Further, the first and second speed output gears are rotatably supported on the output shaft, and a synchromesh is arranged on the output shaft between the two gears. The synchromesh is selectively put into meshing engagement with and disengagement from one of the first and second speed output gears, to connect and disconnect the one of the output gears to and from the output shaft, whereby the speed position of the transmission is set to the first speed position or the second speed position. Similarly, the third and fourth speed input gears are rotatably supported on the input shaft, and another synchromesh is arranged on the input shaft between the two gears. The synchromesh selectively connects and disconnects one of the third and fourth speed input gears to the input shaft, whereby the speed position of the transmission is set to the third speed position or the fourth speed position.

On the other hand, the fifth speed input gear is rotatably supported on the input gear shaft, and connected/disconnected to and from the input shaft by a shift clutch. The shift clutch is of a hydraulic type the engaging force of which is controllable. The shift clutch is arranged on an end portion of the input shaft on a side remote from the engine, and further, a shift cylinder for controlling the shift clutch is arranged at a location outward of the shift clutch. When the speed position of the transmission is set to the fifth speed position, the hydraulic pressure of the shift cylinder is maximized, whereby the shift clutch is completely engaged. On the other hand, in conducting up-shifting operations within a shift range up to the fourth speed by using the synchromeshes, the hydraulic pressure of the shift cylinder is reduced to a smaller value to allow the shift clutch to slide, whereby engine torque is transmitted and supplied to the output shaft as supplemental or compensating torque. In general, in torque transmission by a synchromesh alone, the transmitted torque is reduced to zero or a value close to zero during a time period from completion of synchronization of the synchromesh to establishment of complete meshing engagement thereof. The above control operation for the shift clutch is conducted to prevent this phenomenon of "torque transmission interruption" from causing a feeling of inertia travel which is peculiar to the synchromesh.

However, in the conventional power transmission system, it is required to arrange the hydraulic shift clutch and the shift cylinder for actuating the same on the input shaft along the same in addition to the synchromeshes so as to prevent the driver from having the inertia travel feeling during an up-shifting operation, which increases the length of the transmission in a direction along the input shaft and hence makes it impossible to make the transmission and the power transmission system including the same compact in size. Further, since the supplemental torque is supplied to the output shaft via the fifth speed gear pair, the supplemental torque becomes short particularly in shifting between low speed positions, causing a large step in torque changes, which degrades the speed position-shifting performance of the transmission.

SUMMARY OF THE INVENTION

It is an object of the invention to provide a power transmission system which is capable of positively preventing a feeling of inertia travel from being caused by torque transmission interruption which conventionally occurred when a dog clutch is engaged in shifting the speed position of a transmission, without increasing the axial length of the transmission, thereby improving the speed position-shifting performance of the transmission.

To attain the above object, the present invention provides a power transmission system for transmitting a driving force of a prime mover to driving wheels via a stepped transmission, the stepped transmission including:
- an input shaft connected to the prime mover,
- an output shaft connected to the driving wheels,
- a plurality of gear pairs for at least three speed positions of the stepped transmission, each formed by an input gear arranged on the input shaft, and an output gear arranged on the output shaft and in mesh with the input gear, with one gear of the input gear and the output gear being rotatably supported on the input shaft or the output shaft,
- connecting/disconnecting clutch means of a dog clutch type, for selectively connecting and disconnecting the one gear of the input gear and the output gear of each of the plurality of gear pairs to and from the input shaft or the output shaft rotatably supporting the one gear, to thereby establish a speed position of the stepped transmission by a connected one of the gear pairs including the connected one gear, and
- a driving force assist mechanism for supplying the driving force of the prime mover to the output shaft when a shift in speed position is carried out by the connecting/disconnecting clutch means, wherein the driving force assist mechanism comprises:
- an auxiliary shaft arranged in parallel with the input shaft and the output shaft;
- an intermediate gear integrally formed with the auxiliary shaft and connected to the input shaft;
- an auxiliary gear rotatably supported on the auxiliary shaft and connected to the output shaft; and
- an assist clutch for fastening the auxiliary gear to the auxiliary shaft to thereby transmit the driving force of the prime mover from the input shaft through the auxiliary shaft and the auxiliary gear to the output shaft.

According to this power transmission system, a plurality of gear pairs for at least three speed positions are each formed by an input gear arranged on an input shaft connected to the prime mover, and an output gear arranged on an output shaft connected to driving wheels and in mesh with the input gear, and these gear pairs are selectively connected/disconnected by connecting/disconnecting clutch means of a dog clutch type, to establish a speed position of the transmission by the connected one of the gear pairs. Further, the driving force of the prime mover is transmitted to an auxiliary shaft of a driving force assist mechanism which is arranged in parallel with the input shaft and the output shaft, via the input shaft and an intermediate gear integrally formed with the auxiliary shaft. Then, when the speed position is shifted by using the connecting/disconnecting clutch means, an assist clutch of the driving force assist mechanism fastens an auxiliary gear rotatably supported on the auxiliary shaft to the auxiliary shaft, whereby the driving force transmitted to the auxiliary shaft from the input shaft is transmitted to the output shaft via the engaged auxiliary gear.

As described above, according to the power transmission system, when the speed position of the transmission is shifted by using the connecting/disconnecting clutch means, the driving force of the prime mover is transmitted to the output shaft via the auxiliary gear fastened to the auxiliary shaft by the assist clutch to supply a supplemental or compensating driving force. Therefore, under the condition of the supplemental or compensating driving force being supplied, the connecting/disconnecting clutch means is connected i.e. put into meshing engagement, so that even if transmission of the driving force (torque) via the connecting/disconnecting clutch means is interrupted during the connecting operation thereof, it is possible to prevent the driver from having the feeling of inertial travel. Further, since the auxiliary shaft is arranged in parallel with the input shaft and the output shaft, and at the same time, the intermediate gear, the auxiliary gear, and the assist clutch are arranged on the auxiliary shaft, the above advantageous effects can be obtained without increasing the axial length of the transmission.

Preferably, the auxiliary gear comprises a plurality of auxiliary gears having respective different numbers of gear teeth, and selectively fastened to the auxiliary shaft by the assist clutch.

According to this preferred embodiment, the auxiliary gear comprises a plurality of auxiliary gears having respective numbers of gear teeth, which enables the magnitude of supplemental torque to be set to one of a plurality of steps according to a selected one of the auxiliary gears. Therefore, by selecting one of the auxiliary gears according to a speed position to which the shift should be made, the supplemental torque can be supplied just in an appropriate amount. As a result, it is possible to reduce a torque step occurring during the shift in speed position, thereby improving the speed position-shifting performance of the transmission.

More preferably, the plurality of gear pairs include a gear pair for an N-th speed position and a gear pair for an (N+1)-th speed position one speed position higher than the N-th speed position, and when the stepped transmission is shifted in speed position from the N-th speed position to the (N+1)-th speed position, one of the plurality of auxiliary gears which can transmit the driving force from the input shaft to the output shaft at a change gear ratio approximately equal to a change gear ratio at which the gear pair for the (N+1)-th speed position transmits the driving force is fastened to the auxiliary shaft by the assist clutch, and then after the connecting/disconnecting clutch means effects the disconnection of the gear pair for the N-th speed position, the connecting/disconnecting clutch means effects the connection of the gear pair for the (N+1)-th speed position.

According to this preferred embodiment, when speed position of the transmission is shifted from the N-th speed position to the (N+1)-th speed position, the auxiliary gear is fastened to the auxiliary shaft, and then, after disconnecting the gear pair for the N-th speed position, the gear pair for the (N+1)-th speed is connected. Therefore, the gear pair for the (N+1)-th speed position can be connected under the condition of the supplemental torque being positively supplied to the output shaft via the auxiliary gear. Therefore, even during an up-shift which particularly tends to cause the driver to have the feeling of inertia travel, it is possible to positively prevent the feeling from being given to the driver. Further, as the auxiliary gear fastened in the above process, there is selected one capable of transmitting the torque (driving force) from the input shaft to the output shaft at a change gear ratio approximately equal to a change gear ratio at which the gear pair for the (N+1)-th speed position transmits the torque, it is possible to control the change gear ratio of the transmission during supplemental supply of the torque to approximately the same as that of the gear for the (N+1)-th speed position. Therefore, the connecting engaging) operation of the connecting/disconnecting clutch means can be carried out under the condition of a small difference in rotational speed between the input or output gear of the gear pair for the (N+1)-th speed position and the input shaft or output shaft which are to be connected to each other. This reduces the torque load on the connecting/disconnecting clutch means, and hence it is possible to reduce the torque capacity of the clutch means, and at the same time, reduce the time for a shift in speed position, thereby further improving the speed position-shifting performance of the transmission.

Preferably, the intermediate gear is in mesh with one of the plurality of gear pairs, and the auxiliary gear is in mesh with another of the plurality of gear pairs.

More preferably, the intermediate gear is in mesh with one of the plurality of gear pairs, and the plurality of auxiliary gears are in mesh with respective other ones of the plurality of gear pairs.

According to these preferred embodiments, as the gears for transmitting torque from the input shaft via the intermediate gear to the auxiliary shaft, existing gears of the conventional transmission are commonly used, which makes it possible to reduce the number of gears, and at the same time reduce the axial length of the transmission.

The above and other objects, features, and advantages of the invention will become more apparent from the following detailed description taken in conjunction with the accompanying drawings.

DETAILED DESCRIPTION OF PREFERRED EMBODIMENTS

Figure 1:
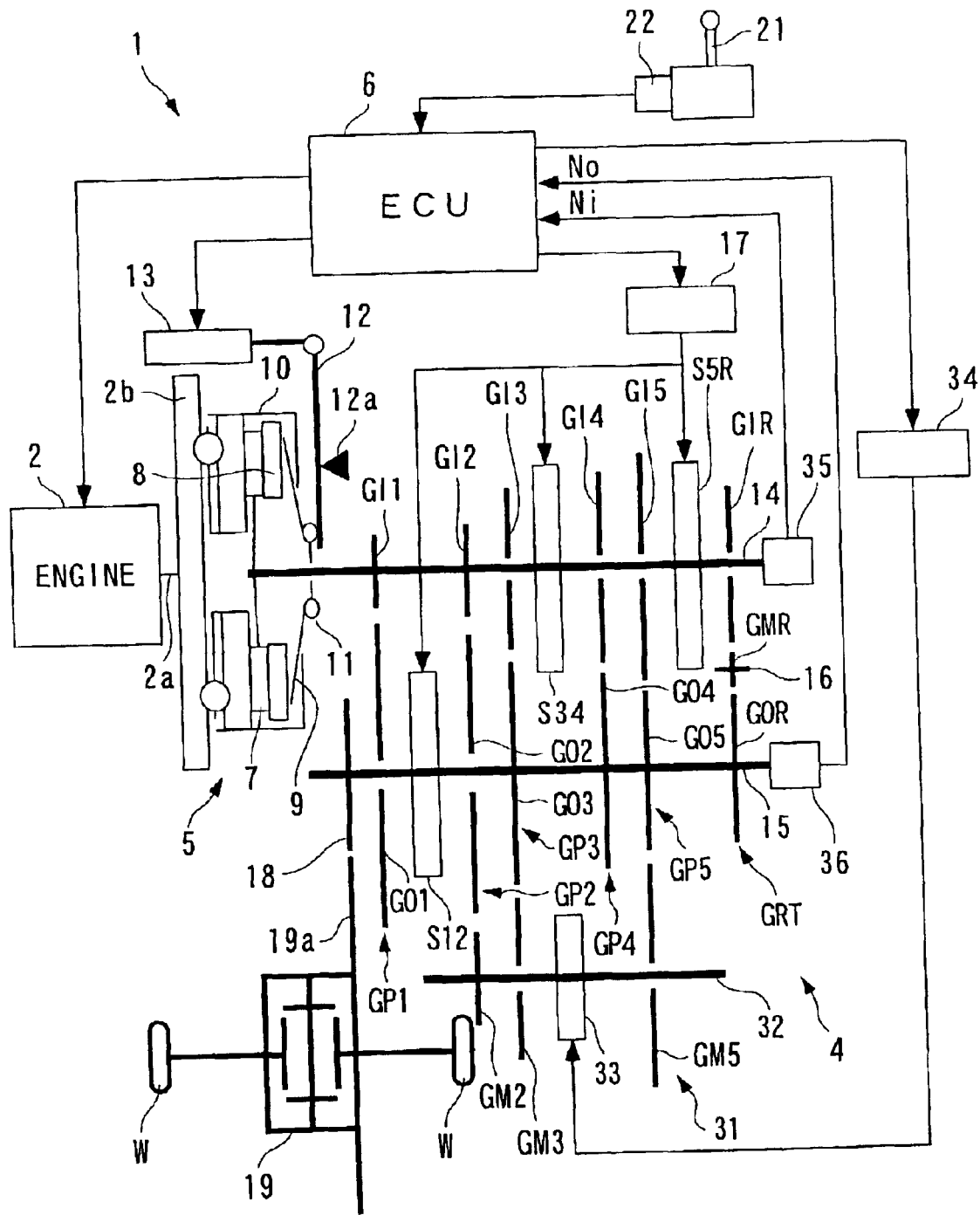
FIG. 1 is a view schematically showing the arrangement of a power transmission system according to a first embodiment of the invention and a vehicle incorporating the same.

The invention will now be described in detail with reference to the drawings showing preferred embodiments thereof. Referring first to FIG. 1, there is schematically shown the arrangement of a power transmission system according to a first embodiment of the invention and a vehicle incorporating the same. The power transmission system 1 transmits torque (driving force) from the engine 2 as a prime mover to driving wheels W, W while changing the rotational speed, and includes a stepped transmission 4, a starting clutch 5 for connecting/disconnecting between the engine 2 and the transmission 4, and an ECU 6 controlling operations of devices including the transmission 4 and the clutch 5.

The clutch 5 includes a friction disk 7, a pressure disk 8, and a diaphragm spring 9, which are arranged in the mentioned order between a flywheel 2b connected to a crankshaft 2a of the engine 2 and the transmission 4. The friction disk 7 is slidably supported on one end of an input shaft 14 of the transmission 4. The diaphragm spring 9 has a central portion thereof supported by a clutch cover 10 and an inner periphery thereof connected to a release bearing 11 slidably mounted on the input shaft 14. Further, the diaphragm spring 9 has an outer periphery thereof held in contact with the pressure disk 8 for urging the same toward the friction disk 7. Connected to the release bearing 11 is one end of a release fork 12 which has an intermediate portion thereof pivotally supported by a fulcrum 12a and the other end thereof connected to a starting actuator 13.

Due to the construction described above, when the starting actuator 13 is not in operation, the friction disk 7 is held in a state firmly sandwiched between the pressure disk 8 and the flywheel 2b by the urging force of the diaphragm spring 9. As a result, the input shaft 14 of the transmission 4 is connected to the crankshaft 2a of the engine 2 via the friction disk 7 and the flywheel 2b, whereby the clutch 5 is held in an engaged state. On the other hand, when the starting actuator 13 operates, the release fork 12 is pivotally moved about the fulcrum 12a in a clockwise direction, as viewed in the figure, to press the release bearing 11 against the diaphragm spring 9. As a result, the diaphragm spring 9 is elastically deformed to move in a direction away from the pressure disk 8, so that the friction disk 7 is released from the sandwiched state, whereby the input shaft 14 of the transmission 4 and the crankshaft 2a of the engine 2 are disconnected from each other to bring the clutch 5 into a disengaged state.

The starting actuator 13 is of a hydraulic type or an electric type, and the operation thereof is controlled by a control signal from the ECU 6. The starting actuator 13 is actuated only at the start of the vehicle, whereby the clutch 5 is controlled to the disengaged state, and then to the engaged state, during the start of the vehicle. The clutch 5 is held in the engaged state at the other times.

The transmission 4 is of an automatic type in which shifting operation is controlled by the ECU 6 according to the shift position of a shift lever 21, etc. The transmission 4 includes the input shaft 14 as a main shaft, an output shaft 15 as a counter shaft, first to fifth speed gear pairs GP1 to GP5 (hereinafter generically referred to as "the gear pairs GP") for forward drive of the vehicle, a reverse gear shaft 16 and a reverse gear train GRT. The input shaft 14, the output shaft 15, and the reverse gear shaft 16 extend in parallel with each other. Further, the transmission 4 is provided with a torque assist mechanism 31 (driving force assist mechanism) for supplying the torque of the engine 2 to the output shaft 5 as supplemental torque during an up-shifting operation of the transmission 4.

The first to fifth speed gear pairs GP1 to GP5 and the reverse gear train GRT are arranged in the mentioned order from the engine side. The first to fifth speed gear pairs GP1 to GP5 are comprised of first to fifth speed input gears GI1 to GI5 arranged on the input shaft 14, and first to fifth speed output gears GO1 to GO5 arranged on the output shaft 15 and in constant mesh therewith, respectively. The respective gear pairs GP1 to GP5 are configured to have predetermined gear ratios such that as a gear pair is of a higher speed position, the gear ratio thereof is smaller. Further, the reverse gear train GRT is comprised of a reverse input gear GIR arranged on the input shaft 14, a reverse intermediate gear GMR arranged on the reverse gear shaft 16, and a reverse output gear GOR arranged on the output shaft 15, which are in mesh with each other. Now, the construction of each of the gear pairs will be sequentially described from the engine side.

The first and second speed input gears GI1 and GI2 of the first and second speed gear pairs GP1 and GO2 are integrally formed with the input shaft 14, while the first and second speed output gears GO1 and GO2 of the same are rotatably fitted on the output shaft 15. Between the first speed output gear GO1 and the second speed output gear GO2, there is arranged a first/second speed synchromesh S12 for selectively switching the speed position of the transmission 4 to a first speed position and a second speed position.

This first/second speed synchromesh S12 (connecting/disconnecting clutch means) has a known construction, and a third/fourth speed synchromesh S34, a fifth/reverse speed synchromesh S5R, and a synchro-clutch 33 of the torque assist mechanism 31, referred to hereinafter, also has the same construction. Therefore, as a representative of these, the construction and operation of the first/second speed synchromesh S12 will be described hereafter with reference to FIGS. 2 and 3A to 3D. It should be noted that the first/second speed synchromesh S12 has its right and left halves constructed symmetrically between the first and the second speed output gears GO1 and GO2, and hence the following description will be basically given by taking the second speed output gear-side half as an example.

Figure 2:
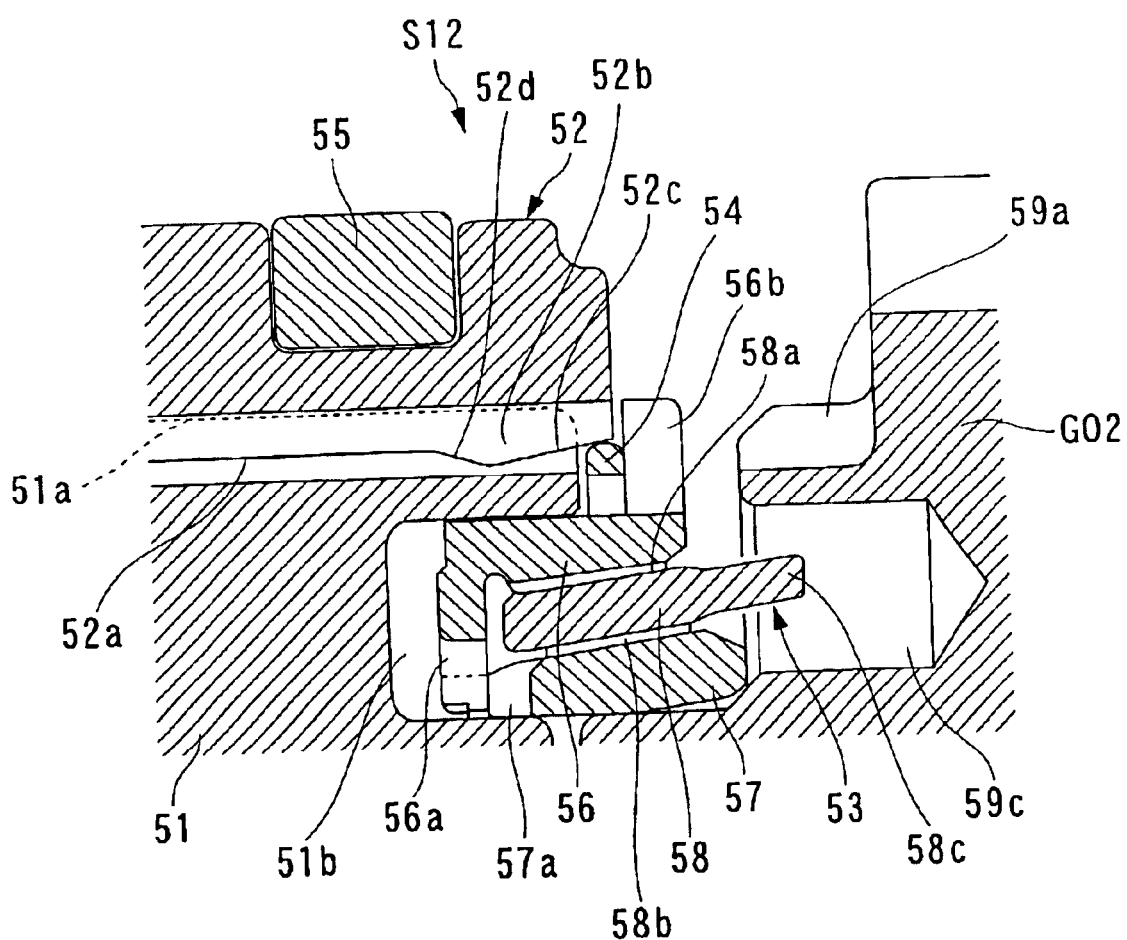
FIG. 2 is a partial cross-sectional view showing the construction of a synchromesh.
Figure 3A:
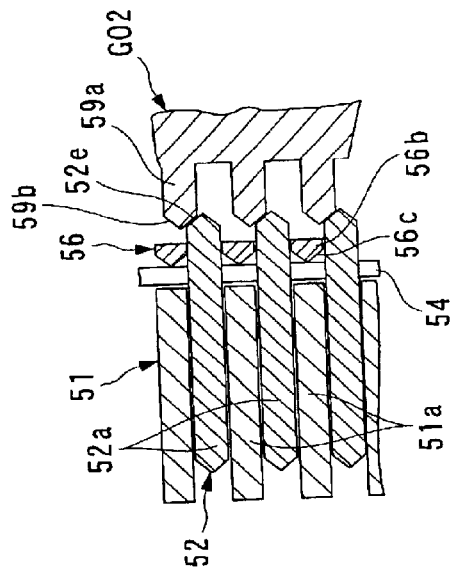
FIGS. 3A to 3D are views useful in explaining operations of the synchromesh.
Figure 3C:
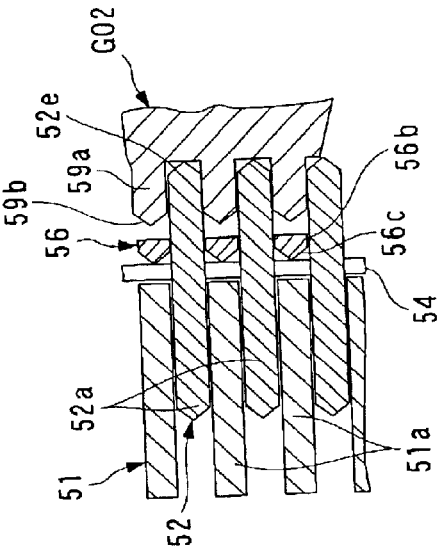
Figure 3B:
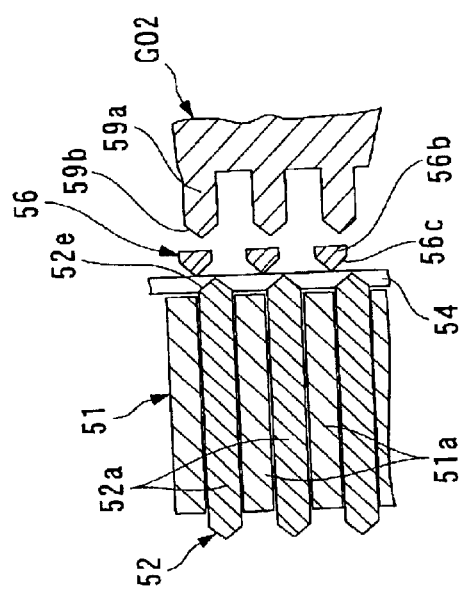
Figure 3D:
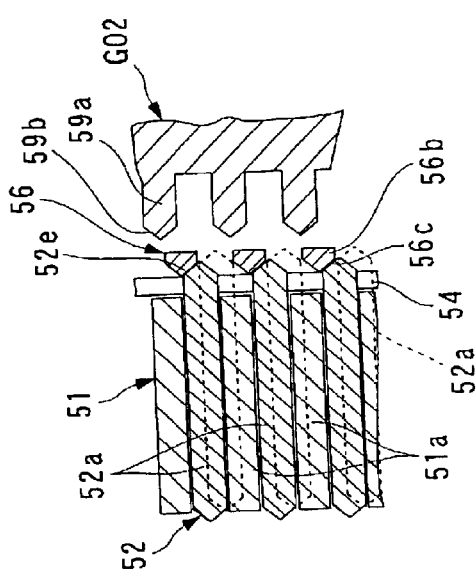

As shown in FIG. 2, the first/second speed synchromesh S12 includes a hub 51 splined to the output shaft 15 and having lots of spline teeth 51a axially extending on an outer peripheral surface thereof, an annular sleeve 52 having an inner peripheral surface thereof formed with lots of spline teeth 52a, and axially slidable along the hub 51 by meshing engagement between the spline teeth 51a and 52a, a blocking ring 53 received in a recess 51b formed in an axial end face of the hub 51, and a synchro-spring 54 arranged on the outer peripheral surface of the blocking ring 53.

A shift fork 55 is fitted on the outer peripheral surface of the sleeve 52. The shift fork 55 is actuated by a shift actuator 17 (see FIG. 1) connected thereto, to actuate the sleeve 52 in the axial direction with respect to the hub 51. The spline teeth 52a as portions of the sleeve 52 are each formed with a protrusion 52b protruding radially inward from an axial end thereof. Each protrusion 52b has a radially inner surface thereof continuously formed with first and second slopes 52c, 52d in the mentioned order from the axial end face of the sleeve 52.

The blocking ring 53 is comprised of an outer ring 56 arranged at a location radially outward, an inner ring 57 arranged at a location radially inward, and a tapered cone 58 interposed between the two rings 56, 57. The outer ring 56 and the inner ring 57 are formed with locking pieces 56a, 57a, respectively, and locked to each other by engagement between the locking pieces 56a, 57a inhibiting relative rotation of the two rings 56, 57. The tapered cone 58 has outer and inner peripheral surfaces formed as tapered surfaces 58a, 58b, respectively. The inner peripheral surface of the outer ring 56 is slidably held in contact with the tapered surface 58a, while the outer peripheral surface of the inner ring 57 is slidably held in contact with the tapered surface 58b.

The outer ring 56 has an axial end portion thereof formed with lots of dog teeth 56b (see FIGS. 3A to 3D) each projecting radially outward, while the second speed output gear GO2 opposed to the dog teeth 56b also has an end portion thereof formed with lots of dog teeth 59a (see FIGS. 3A to 3D). These dog teeth 56b, 59a are formed in a manner meshable with the spline teeth 52a of the sleeve 52. Further, as shown in FIGS. 3A to 3D, the spline teeth 52a of the sleeve 52 each have an end formed with an inclined surface portion 52e, while each dog tooth 56b of the outer ring 56 and each dog tooth 59a of the second speed output gear GO2 have respective ends thereof formed with inclined surface portions 56c and 59b with which the inclined surface portion 52e can be brought into contact. The tapered cone 58 is formed with protrusions 58c protruding outward in the axial direction. The protrusions 58c are loosely fitted in respective recesses 59c formed in the second speed output gear GO2.

The synchro-spring 54 is supported by a plurality of spring supporting portions, not shown, formed at circumferentially spaced intervals on the outer peripheral surface of the outer ring 56. As shown in FIG. 2, when the sleeve 52 is in a neutral position, the synchro-spring 54 is surrounded by the dog teeth 56b of the outer ring 56, the axial end face of the hub 51, and the axial end portions of the respective spline teeth 52a of the sleeve 52.

According to the construction described above, when the sleeve 52 is in the neutral position as shown in FIG. 2, the respective protrusions 52b of its spline teeth 52a are not in contact with the synchro-spring 54, and hence the urging force of the synchro-spring 54 does not act on the outer ring 56. Consequently, the outer and inner rings 56 and 57 of the blocking ring 53 are in a state relatively rotatable with respect to the tapered cone 58 of the same. Therefore, while the outer ring 56 and the inner ring 57 rotate in unison with each other, the tapered cone 58 rotates in unison with the second speed output gear GO2, so that synchronizing operation does not occur between the sleeve 52 and hence the output shaft 15 and the second speed output gear GO2 (see FIG. 3A).

When the sleeves 52 is slid from the above position toward the second speed output gear GO2 by the shift fork 55 actuated by the shift actuator 17, the first slope 52c of the sleeve 52 urges the outer ring 56 of the blocking ring 53 via the synchro-spring 54 toward the second speed output gear GO2. Further, the inclined surface portion 52e of each spline tooth 52a of the sleeve 52 is brought into a state pressed by the inclined surface portion 56c of the corresponding dog tooth 56b of the outer ring 56 (see FIG. 3B), whereby a large frictional force is generated between the outer and inner rings 56 and 57 of the blocking ring 53 and the tapered cone 58 of the same. In this state, synchronizing operation is performed between the output shaft 15 and the second speed output gear GO2.

Then, when the synchronizing operation is completed, the difference in rotational speed between the output shaft 15 and the second speed output gear GO2 is reduced to zero, so that rotations of the output shaft 15 and the second speed output gear GO2 are made synchronous with each other, whereupon the resistance of the blocking ring 53 to the movement of the sleeve 52 is reduced or disappears. As a result, the spline teeth 52a of the sleeve 52 are each entered between dog teeth 56b, 56b of the outer ring 56 (see broken lines in FIG. 3B). Further, each spline tooth 52a is brought into abutment on the inclined surface portion 59c of the corresponding dog tooth 59a of the second speed output gear GO2 (see FIG. 3C), and then fitted between the dog tooth 59a and an adjacent dog tooth 59a (see FIG. 3D). This causes the second speed output gear GO2 and the output shaft 15 to be completely united with each other, whereby the second speed gear pair GP2 is placed in the connected state, which establishes the second speed position of the transmission 4. It should be noted that during a time period from completion of the synchronization between the blocking ring 53 and the second speed output gear GO2 to the time point the spline teeth 52a of the sleeve 52 are each brought into abutment on the inclined surface portion 59b of the corresponding dog tooth 59a of the second speed output gear GO2 (i.e. between the state indicated by the broken lines in FIG. 3B and the state shown in FIG. 3C), a frictional force between the blocking ring 53 and the second speed output gear GO2 is reduced or disappears, and hence torque transmitted to the output shaft 15 is reduced to zero or a value close to zero.

Although not shown, when the sleeve 52 is slid toward the first speed output gear GO1 (left-hand side in FIG. 2), in quite the same manner as the above operation, the spline teeth 52a of the sleeve 52 are brought into meshing engagement with the dog teeth 59a of the first speed output gear GO1 after completion of synchronization between the blocking ring 53 and the first speed output gear GO1. This causes the first speed output gear GO1 and the output shaft 15 to be completely united with each other, whereby the first speed output gear GO1 is placed in the connected state. In this case, the transmission 4 is set to the first speed position. Further, when the sleeve 52 is held in the neutral position, the first and second speed gear pairs GP1 and GP2 are both held in the disconnected state.

It should be noted that the shift actuator 17 for actuating the sleeve 52 is of a hydraulic or electric type, and the operation thereof is controlled by the ECU 6. Further, during the synchronizing operation in which the spline teeth 52a of the sleeve 52 are pressed against the respective dog teeth 56b of the blocking ring 53 for the synchronization, the pressing load can be controlled to control the amount of torque to be transmitted from the input shaft 14 to the output shaft 15 via the first/second speed synchromesh S12. This pressing load is also controlled by the ECU 6 via the shift actuator 17. The other synchromeshes S34 and S5R, referred to hereinafter, are each similar in construction and operation to the first/second speed synchromesh S12 described above. These synchromeshes will be generically referred to as "the synchromeshes S".

On the other hand, the third and fourth speed gear pairs GP3 and GP4 located next to the gear pairs GP1 and GP2 have a third speed input gear GI3 and a fourth speed input gear GI4, respectively, each of which is rotatably fitted on the input shaft 14, and a third speed output gear GO3 and a fourth speed output gear GO4, respectively, each of which is integrally formed with the output shaft 15. The third/fourth speed synchromesh S34 (connecting/disconnecting clutch means) similar in construction to the above first/second speed synchromesh S12 is arranged between the third and fourth speed input gears GI3 and GI4. Accordingly, the third/fourth speed synchromesh S34 is actuated by the shift actuator 17 to thereby selectively connect one of the third speed input gear GI3 and the fourth speed input gear GI4 to the input shaft 14 or disconnects them from the same simultaneously. Thus, the transmission 4 is set to the third or fourth speed position.

Similarly, the fifth gear pair GP5 and the reverse gear train GRT located next to the gear pairs GP3 and GP4 have a fifth speed input gear GI5 and a reverse input gear GIR, respectively, each of which is rotatably fitted on the input shaft 14, and a fifth speed output gear GO5 and a reverse output gear GOR, respectively, each of which is integrally formed with the output shaft 15. The fifth/reverse speed synchromesh S5R (connecting/disconnecting clutch means) is arranged between the fifth speed input gear GI5 and the reverse input gear GIR. Accordingly, the fifth/reverse speed synchromesh S5R selectively connects one of the fifth speed input gear GI5 and the reverse input gear GIR to the input shaft 14 or disconnects them from the same simultaneously. Thus, when the fifth gear pair GP5 is connected, the speed position of the transmission 4 is set to the fifth speed position, whereas when the reverse gear train GRT is connected, it is set to the reverse position due to the existence of the reverse intermediate gear GMT.

The torque assist mechanism 31 is comprised of an auxiliary shaft 32 arranged outward of the output shaft 15 in parallel therewith, a second speed auxiliary gear GM2 (intermediate gear), a third speed auxiliary gear GM3 (auxiliary gear), and a fifth speed auxiliary gear GM5 (auxiliary gear), all arranged on the auxiliary shaft 32, an assist clutch 33 arranged on the auxiliary shaft 32, and an assist actuator 34 of a hydraulic type or an electric type for actuating the assist clutch 33. The second speed auxiliary gear GM2 has the same number of gear teeth as that of gear teeth of the second speed input gear GI2, and is integrally formed with the auxiliary shaft 32 and in mesh with the second speed output gear GO2. According to this construction, the rotation of the engine 2 is always transmitted from the input shaft 14, through the path of the second speed input gear GI2 -> second speed output gear GO2 -> second speed auxiliary gear GM2, to the auxiliary shaft 32, and since the second speed input gear GI2 and the second speed auxiliary gear GM2 have the same number of gear teeth, the auxiliary shaft 32 rotates at the same rotational speed as that of the input shaft 14.

Further, the third and fifth speed auxiliary gears GM3, GM5 have the respective same numbers of gear teeth as those of the third and fifth speed input gears GI3, GI5, and are rotatably fitted on the auxiliary shaft 32 and in mesh with the third and fifth speed output gears GO3, GO5, respectively, with the assist clutch 33 being arranged between the auxiliary gears GM3, GM5.

The assist clutch 33 is formed by a synchromesh having the same construction as that of the synchromesh S described hereinabove. Further, the assist clutch 33 is provided for supplying the torque of the input shaft 14 to the output shaft 15 during a shift in speed position of the transmission, and hence, differently from the synchromeshes S, it does not perform the connecting operation but is used only in a state in which the spline teeth 52a of the sleeve 52 are slid to be pressed against (engaged with) the dog teeth 56b of the blocking ring 53. By controlling the pressing load to vary the engaging force (amount of sliding) of the assist clutch 33, it is possible to control the magnitude of torque transmitted to the output shaft 15 and the rotational speed of the output shaft 15. The operation of the assist clutch 33 is controlled by the ECU 6 via the assist actuator 34.

Due to the above construction, when the assist clutch 33 is operated or moved toward the third speed auxiliary gear GM3, the third speed auxiliary gear GM3 is fastened to the auxiliary shaft 32, whereby the torque of the engine 2 transmitted from the input shaft 14 through the path of the second speed input gear GI2 -> second speed output gear GO2 -> second speed auxiliary gear GM2, to the auxiliary shaft 32 is further transmitted from the auxiliary shaft 32 through the path of the third speed auxiliary gear GM3 -> third speed output gear GO3, to the output shaft 15. On the other hand, when the assist clutch 33 is operated or moved toward the fifth speed auxiliary gear GM5, the fifth speed auxiliary gear GM5 is fastened to the auxiliary shaft 32, whereby the torque of the engine 2 transmitted to the auxiliary shaft 32 via the second speed auxiliary gear GM2 etc., is further transmitted to the output shaft 15 via the path of the fifth speed auxiliary gear GM3 -> fifth speed output gear GO3.

The output shaft 15 has a connection gear 18 integrally formed therewith, which is in constant mesh with a gear 19a of a differential 19. Accordingly, the torque of the engine 2 is transmitted to the output shaft 15 at a change gear ratio of the transmission 4, and then transmitted to the driving wheels W, W via the differential 19, to drive the driving wheels W, W for rotation.

Further, the input shaft 14 and the output shaft 15 have an input shaft rotational speed sensor 35 and an output shaft rotational speed sensor 36 provided therefor for detecting respective rotational speeds (input shaft rotational speed Ni, output shaft rotational speed No) thereof, and respective signals indicative of the detected rotational speeds are delivered to the ECU 6.

The ECU 6 is implemented by a microcomputer comprised of a RAM, a ROM, a CPU and an input/output interface (none of which is shown). The ECU 6 drives the starting actuator 13 and the shift actuator 17 e.g. according to the shift position of the shift lever 21, which is detected by a shift position sensor 22, to thereby control the operations of the clutch 5 and the transmission 4. Further, the ECU 6 also perform torque control of the engine 2 required for control of the transmission 4.

Figure 4:
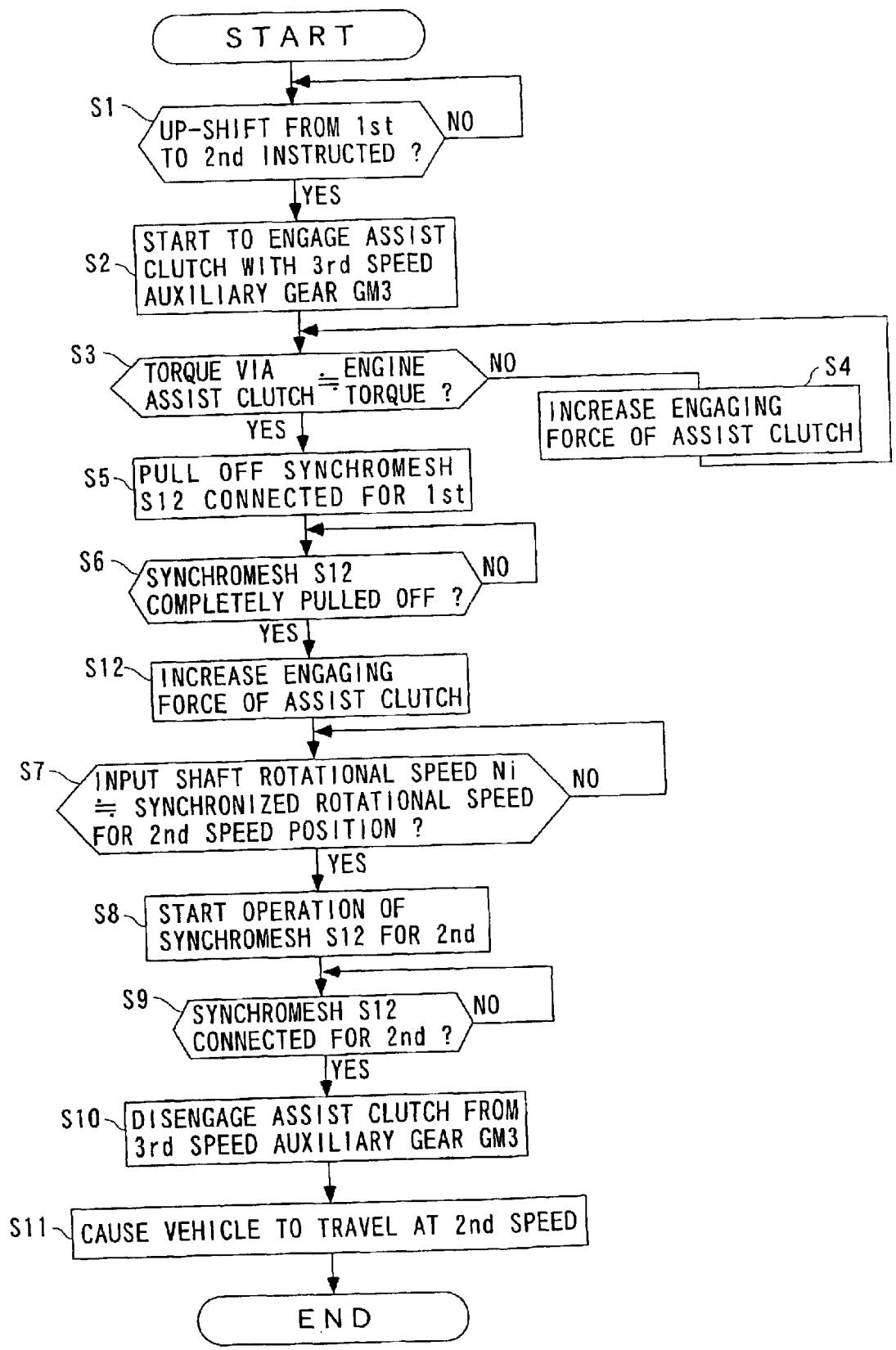
FIG. 4 is a flowchart of a supplemental torque supply process in an up-shift of the speed position of a transmission from a first speed position to a second speed position.

Next, a supplemental torque supply process executed by the ECU 6 will be described with reference to FIGS. 4 to 6. The supplemental torque supply process is carried out so as to prevent the inertia travel feeling from being caused by torque transmission interruption occurring when a synchromesh S comes into an engaged state during up-shifting of the speed position of the transmission 4. FIG. 4 shows a case of the speed position of the transmission 4 being up-shifted from the first speed position to the second speed position. First, it is determined in a step 1 (in the figures, shown as "S1", the other steps being also shown in the same manner) whether or not a shift instruction has been delivered which instructs that the transmission 4 should be up-shifted from the first speed position (1st) in which the first speed gear pair GP1 is connected to the output shaft 15 by the first/second speed synchromesh S12 to the second speed position (2nd).

Figure 5:
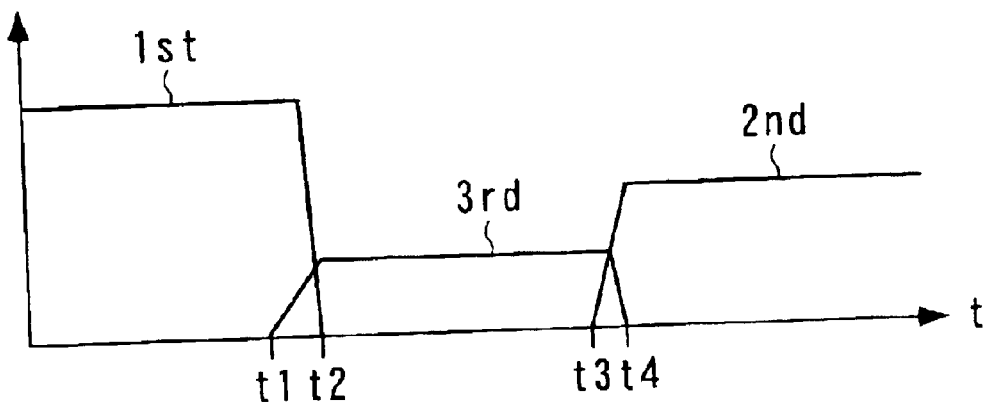
FIG. 5 is a timing chart showing an example of operations carried out according to the FIG. 4 supplemental torque supply process.

If the answer to the question is affirmative (YES), the program proceeds to a step 2, wherein the assist clutch 33 is moved toward the third speed auxiliary gear GM3 to start engagement thereof (fastening of the gear GM3 to the auxiliary shaft 32) (time t1 in FIG. 5). This allows, while maintaining the change gear ratio of the transmission set to the first speed position, the torque of the engine 2 transmitted to the auxiliary shaft 32 via the second speed auxiliary gear GM2 etc. starts to be transmitted to the output shaft 15 via the third speed auxiliary gear GM3 and the third speed output gear GO3. The torque thus transmitted is progressively increased, and accordingly, the torque transmitted via the first/second speed synchromesh S12 is reduced.

Then, it is determined in a step 3 whether or not the torque transmitted via the assist clutch 33 has become approximately equal to the torque of the engine 2. If the answer to this question is negative (NO), the engaging force of the assist clutch 33 is increased (step 4), and when the former becomes approximately equal to the latter (time t2), the operation of pulling the sleeve 52 of the first/second speed synchromesh S12 off the first speed output gear GO1 is started (step 5) so as to disconnect the first speed gear pair GP1 from the output shaft 15. This makes it possible to pull the sleeve 52 off without difficulty, without damaging the spline teeth 52a of the first/second synchromesh S12. Then, it is determined in a step 6, whether or not the pulling (disconnecting) operation has been completed, and when it is completed, the engaging force of the assist clutch 33 is increased (step 12). This lowers the input shaft rotational speed Ni.

Then, from the relationship between the detected input shaft rotational speed Ni and the output shaft rotational speed No, it is determined in a step 7, whether or not the input shaft rotational speed Ni is approximately equal to a synchronized rotational speed corresponding to the change gear ratio of the second speed position. If the answer to this question is affirmative (YES), i.e. if the output shaft rotational speed No detected at this time is approximately equal to the rotational speed of the second speed output gear GO2, the connecting operation of the first/second speed synchromesh S12 toward the second speed output gear GO2 is started (time t3). This causes the synchronizing operation to be performed under the condition of the spline teeth 52a of the first/second speed synchromesh S12 being urged against the dog teeth 56b of the blocking ring 53, whereby the second speed output gear GO2 is made synchronous with the output shaft 15. Further, after the completion of the synchronization, the spline teeth 52a of the first/second synchromesh S12 are put into meshing engagement with the dog teeth 59a of the second output gear GO2, whereby the first/second synchromesh S12 comes to be completely united with the second speed output gear GO2. Then, it is determined in a step 9, whether or not the connecting operation of the first/second speed synchromesh S12 is completed. If the answer to this question is affirmative (YES), the assist clutch 33 is disengaged (fastening of the auxiliary gear GM3 to the auxiliary shaft 32 is canceled) in a step 10 (time t4), causing the vehicle to travel at the second speed thereafter (step 11).

During the time period from the completion of the synchronization of the first/second speed synchromesh S12 to the meshing engagement of the same with the second speed output gear GO2, the torque transmitted via the first/second speed synchromesh S12 is reduced to zero or a value close to zero. However, at this time point, the torque of the engine 2 has come to be transmitted to the output shaft 15 via the assist clutch 33 as supplemental (or compensation) torque, so that the driver cannot sense torque transmission interruption. Thus, a feeling of inertia travel can be prevented from being given to the driver.

Further, although not shown, when the speed position of the transmission 4 is up-shifted from the second speed position to the third speed position, basically the same supplemental torque supply process is carried out as carried out in the case of up-shifting from the first speed position to the second speed position. More specifically, in this up-shifting, the assist clutch 33 is operated or moved toward the third speed auxiliary gear GM3, and at the same time, when the torque transmitted thereby has become approximately equal to the torque of the engine 2, the operation of pulling the first/second synchromesh S12 off the second speed output gear GO2 is started to thereby disconnect the second speed gear pair GP2. Further, when the input shaft rotational speed Ni has become approximately equal to a synchronized rotational speed corresponding to the change gear ratio of the third speed position, the third/fourth speed synchromesh S34 is moved toward the third speed input gear GI3, and after completion of the synchronization of the third/fourth speed synchromesh S34, when the connecting operation of the same is terminated, the assist clutch 33 is disengaged, causing the vehicle to travel at the third speed thereafter.

Figure 6:
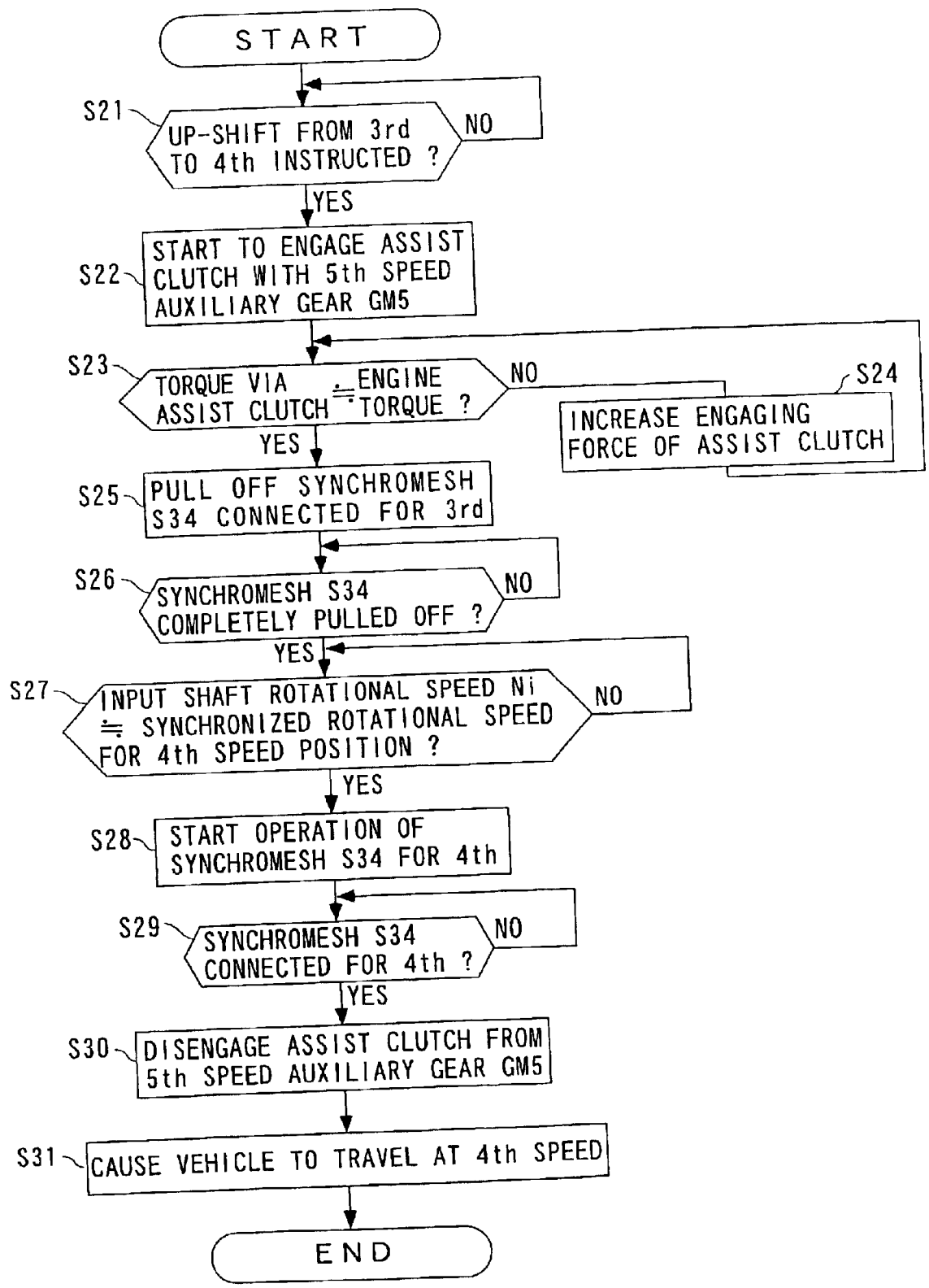
FIG. 6 is a flowchart of a supplemental torque supply process in an up-shift of the speed position from a third speed position to a fourth speed position.

FIG. 6 shows a supplemental torque supply process for up-shifting the speed position of the transmission 4 from the third speed position to the fourth speed. As shown in the figure, this torque supply process is basically the same as the FIG. 4 process for the up-shift from the first speed position to the second speed position, but the assist clutch 33 is actuated toward the fifth speed auxiliary gear GM5. More specifically, when a shift instruction for an up-shift from the third speed position to the fourth speed position has been delivered (Yes to step 21), the assist clutch 33 starts to be actuated toward the fifth speed auxiliary gear GM5 (step 22), and the engaging force thereof is increased (step 24) until the torque transmitted thereby becomes approximately equal to the torque of the engine 2 (Yes to step 23), whereupon the operation of pulling the third/fourth speed synchromesh S34 off the third speed input gear GI3 is started (step 25). Then, after completion of this pulling operation (Yes to step 26), when the input shaft rotational speed Ni has become approximately equal to a synchronized rotational speed corresponding to the change gear ratio of the fourth speed position (Yes to step 27), the actuation of the third/fourth speed synchromesh S34 toward the fourth speed input gear GI4 is started (step 28). Then, after completion of synchronization of the third/fourth speed synchromesh S34, when the engaging operation of the same is terminated (Yes to step 29), the assist clutch 33 is disengaged (step 30), causing the vehicle to travel at the fourth speed thereafter (step 31).

Further, although not shown, when the speed position of the transmission 4 is up-shifted from the fourth speed position to the fifth speed position, a supplemental torque supply process similar to the above is carried out. In this case, after the assist clutch 33 is actuated toward the fifth speed auxiliary gear GM5, the third/fourth speed synchromesh S34 is pulled off the fourth speed input gear GI4 for disconnection, and then the fifth speed input gear GI5 is connected to the input shaft 14 by the fifth/reverse speed synchromesh S5R.

As described above, according to the power transmission system of the present embodiment, when the speed position of the transmission 4 is up-shifted, under the condition of the torque of the engine 2 being supplied as supplemental torque to the output shaft 15, via the third speed auxiliary gear GM3 or the fifth speed auxiliary gear GM5 fastened to the auxiliary shaft 32 by the assist clutch 33, the synchromesh S is made synchronous in rotational speed, connected, and meshed. This makes it possible to positively prevent the torque transmission interruption from occurring during the up-shift to cause the feeling of inertia travel.

Further, during an up-shift from the first speed position to the second speed position and an up-shift from the second speed position to the third speed position, the third auxiliary gear GM3 is used, and during an up-shift from the third speed position to the fourth speed position and an up-shift from the fourth speed position to the fifth speed position, the fifth auxiliary gear GM5 is used. Thus, one of the auxiliary gears having a change gear ratio close to that of a destination speed position is selected to supply supplemental torque, which makes it possible to supply the torque just in an appropriate amount. As a result, it is possible to reduce a torque step during the up-shift to thereby improve the speed position-shifting performance of the transmission 4. Further, for the same reason, during the supply of the supplemental torque, the output shaft rotational speed No or the input shaft rotational speed Ni can be controlled to a synchronized rotational speed corresponding to the change gear ratio of a destination speed position, and a synchromesh S is operated in this state. Therefore, the synchronizing operation can be carried out in a state of a reduced difference in rotational speed between the synchromesh S and a gear of an associated gear pair to be connected therewith. This makes it possible to reduce the torque load on the synchromesh S and shorten the time for the shift, which further improves the speed position-shifting performance of the transmission 4.

Further, since the auxiliary shaft 32 is arranged in parallel with the input shaft 14 and the output shaft 15, and the remaining elements of the torque assist mechanism 31, i.e. the second, third, and fifth speed auxiliary gears GM2, GM3, and GM5, and the assist clutch 33 are arranged on the auxiliary shaft 32, the above advantageous effects can be obtained without increasing the axial length of the transmission 4. Further, as the gear for transmitting the torque of the input shaft 14 to the auxiliary shaft 32 via the second speed auxiliary gear GM2, the existing second gear pair GP2 of the transmission 4 is commonly used. Therefore, the number of gears of the transmission 4 can be reduced due to the common use, and at the same time the axial length of the transmission 4 can be shortened.

Figure 7:
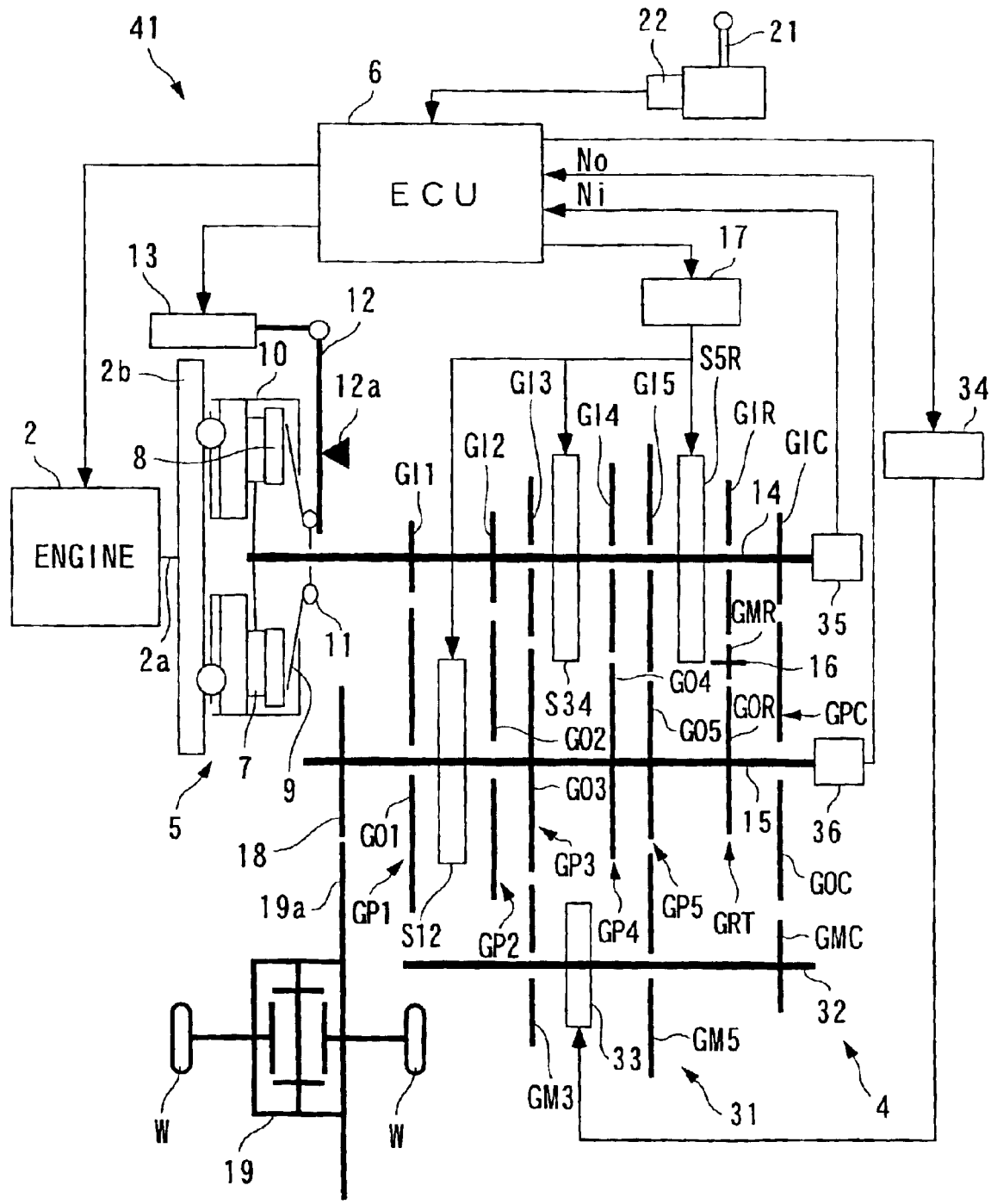
FIG. 7 is a view similar to FIG. 1, which shows a second embodiment of the invention.

FIG. 7 shows a power transmission system according to a second embodiment of the invention. This power transmission system 41 is distinguished from the power transmission system 1 of the first embodiment which makes use of the second gear pair GP2 of the transmission 4 as gears for transmitting supplemental torque from the input shaft 14 to the auxiliary shaft 32, in that a dedicated gear pair GPC is provided for supplying the supplemental torque. This gear pair GPC is arranged axially outward of the reverse gear train GRT, and is comprised of an input gear GIC integrally formed with the input shaft 14, and an output gear GOC rotatably supported on the output shaft 15 and in mesh with the input gear GIC. In a manner associated therewith, an intermediate gear GMC in mesh with the output gear GOC is integrally formed with the auxiliary shaft 32. Now, the number of gear teeth of the intermediate gear GMC is the same as that of gear teeth of the input gear GIC. Therefore, similarly to the first embodiment, the auxiliary shaft 32 rotates at the same rotational speed as the input shaft 14. The remainder of the construction of the second embodiment is quite the same as that of the first embodiment, including the supplemental torque supply process carried out thereby.

Therefore, this power transmission system 41 operates in the same manner as that of the first embodiment, and hence the advantageous effects provided by the first embodiment as described above can be obtained in the same manner, except that the dedicated gear pair GPC for the supplemental torque supply is provided. It should be noted that by configuration of the numbers of gear teeth of the gear pair GPC and gear teeth of the intermediate gear GMC, the change gear ratio of a path from the input shaft 12 to the auxiliary shaft 32 can be set to a value other than 1.0. For example, by setting the change gear ratio to a value smaller than 1.0, the synchronization for the speed position shifting can be more easily timed.

It should be noted that the present invention is not necessarily limited to the embodiments described above, but can be practiced in various forms. For example, although in the embodiments, a synchro-clutch is used as the assist clutch 33 of the torque assist mechanism 31, this is not limitative, but any other type of clutch, e.g. of a hydraulic type or an electric type, may be used so long as it has a function of sliding since the assist clutch 33 is used in a slid state. Further, although in the embodiments, as the auxiliary gear for transmitting supplemental torque from the auxiliary shaft 32 to the output shaft 15, there are provided the third and fifth speed auxiliary gears GM3, GM5, this is not limitative, but such auxiliary gears may be provided for respective speed positions, i.e. for the second to fifth speeds. Further, by setting the number of gear teeth of an auxiliary gear differently from that of gear teeth of an input gear connected thereto, the gear change ratio of a path of transmission of torque from the input shaft to the auxiliary shaft for assisting torque supply may be set independently.

It is further understood by those skilled in the art that the foregoing is a preferred embodiment of the invention, and that various changes and modifications may be made without departing from the spirit and scope thereof.

What is claimed is:

1. A power transmission system for transmitting a driving force of a prime mover to driving wheels via a stepped transmission, said stepped transmission including:
an input shaft connected to the prime mover,
an output shaft connected to the driving wheels,
a plurality of gear pairs for at least three speed positions of said stepped transmission, each formed by an input gear arranged on said input shaft, and an output gear arranged on said output shaft and in mesh with said input gear, with one gear of said input gear and said output gear being rotatably supported on said input shaft or said output shaft,
connecting/disconnecting clutch means, for selectively connecting and disconnecting said one gear of said input gear and said output gear of each of said plurality of gear pairs to and from said input shaft or said output shaft rotatably supporting said one gear, to thereby establish a speed position of said stepped transmission by a connected one of said gear pairs including said connected one gear, and
a driving force assist mechanism for supplying the driving force of the prime mover to said output shaft when a shift in speed position is carried out by said connecting/disconnecting clutch means,
wherein said driving force assist mechanism comprises:
an auxiliary shaft arranged in parallel with said input shaft and said output shaft;
an intermediate gear integrally formed with said auxiliary shaft and connected to said input shaft;
an auxiliary gear rotatably supported on said auxiliary shaft and connected to said output shaft; and
an assist clutch for fastening said auxiliary gear to said auxiliary shaft to thereby transmit the driving force of the prime mover from said input shaft through said auxiliary shaft and said auxiliary gear to said output shaft,
wherein said auxiliary gear comprises a plurality of auxiliary gears having respective different numbers of gear teeth, and selectively fastened to said auxiliary shaft by said assist clutch.

2. A power transmission system according to claim 1, wherein said plurality of gear pairs include a gear pair for an N-th speed position and a gear pair for an (N+1)-th speed position one speed position higher than the N-th speed position, and when said stepped transmission is shifted in speed position from the N-th speed position to the (N+1)-th speed position, one of said plurality of auxiliary gears which can transmit the driving force from said input shaft to said output shaft at a change gear ratio approximately equal to a change gear ratio at which said gear pair for the (N+1)-th speed position transmits the driving force is fastened to said auxiliary shaft by said assist clutch, and then after said connecting/disconnecting clutch means effects the disconnection of said gear pair for the N-th speed position, said connecting/disconnecting clutch means effects the connection of said gear pair for the (N+1)-th speed position.

3. A power transmission clutch according to claim 2, wherein said intermediate gear is in mesh with one of said plurality of gear pairs, and said plurality of auxiliary gears are in mesh with respective other ones of said plurality of gear pairs.

4. A power transmission clutch according to claim 1, wherein said intermediate gear is in mesh with one of said plurality of gear pairs, and said plurality of auxiliary gears are in mesh with respective other ones of said plurality of gear pairs.

5. A power transmission system for transmitting a driving force of a prime mover to driving wheels via a stepped transmission, said stepped transmission including:
   an input shaft connected to the prime mover,
   an output shaft connected to the driving wheels,
   a plurality of gear pairs for at least three speed positions of said stepped transmission, each formed by an input gear arranged on said input shaft, and an output gear arranged on said output shaft and in mesh with said input gear, with one gear of said input gear and said output gear being rotatably supported on said input shaft or said output shaft,
   connecting/disconnecting clutch means, for selectively connecting and disconnecting said one gear of said input gear and said output gear of each of said plurality of gear pairs to and from said input shaft or said output shaft rotatably supporting said one gear, to thereby establish a speed position of said stepped transmission by a connected one of said gear pairs including said connected one gear, and
   a driving force assist mechanism for supplying the driving force of the prime mover to said output shaft when a shift in speed position is carried out by said connecting/disconnecting clutch means,
   wherein said driving force assist mechanism comprises:
      an auxiliary shaft arranged in parallel with said input shaft and said output shaft;
      an intermediate gear integrally formed with said auxiliary shaft and connected to said input shaft;
      an auxiliary gear rotatably supported on said auxiliary shaft and connected to said output shaft; and
      an assist clutch for fastening said auxiliary gear to said auxiliary shaft to thereby transmit the driving force of the prime mover from said input shaft through said auxiliary shaft and said auxiliary gear to said output shaft,
      wherein said intermediate gear is in mesh with one of said plurality of gear pairs, and said auxiliary gear is in mesh with another of said plurality of gear pairs.

6. A power transmission clutch according to claim 5, wherein said auxiliary gear comprises a plurality of auxiliary gears having respective different numbers of gear teeth, and selectively fastened to said auxiliary shaft by said assist clutch.

7. A power transmission clutch according to claim 6, wherein said plurality of gear pairs include a gear pair for an N-th speed position and a gear pair for an (N+1)-th speed position one speed position higher than the N-th speed position, and when said stepped transmission is shifted in speed position from the N-th speed position to the (N+1)-th speed position, one of said plurality of auxiliary gears which can transmit the driving force from said input shaft to said output shaft at a change gear ratio approximately equal to a change gear ratio at which said gear pair for the (N+1)-th speed position transmits the driving force is fastened to said auxiliary shaft by said assist clutch, and then after said connecting/disconnecting clutch means effects the disconnection of said gear pair for the N-th speed position, said connecting/disconnecting clutch means effects the connection of said gear pair for the (N+1)-th speed position.

* * * * *